May 6, 1930.  T. S. RAINEY  1,757,875
SUSPENSION HOOK
Filed June 1, 1929
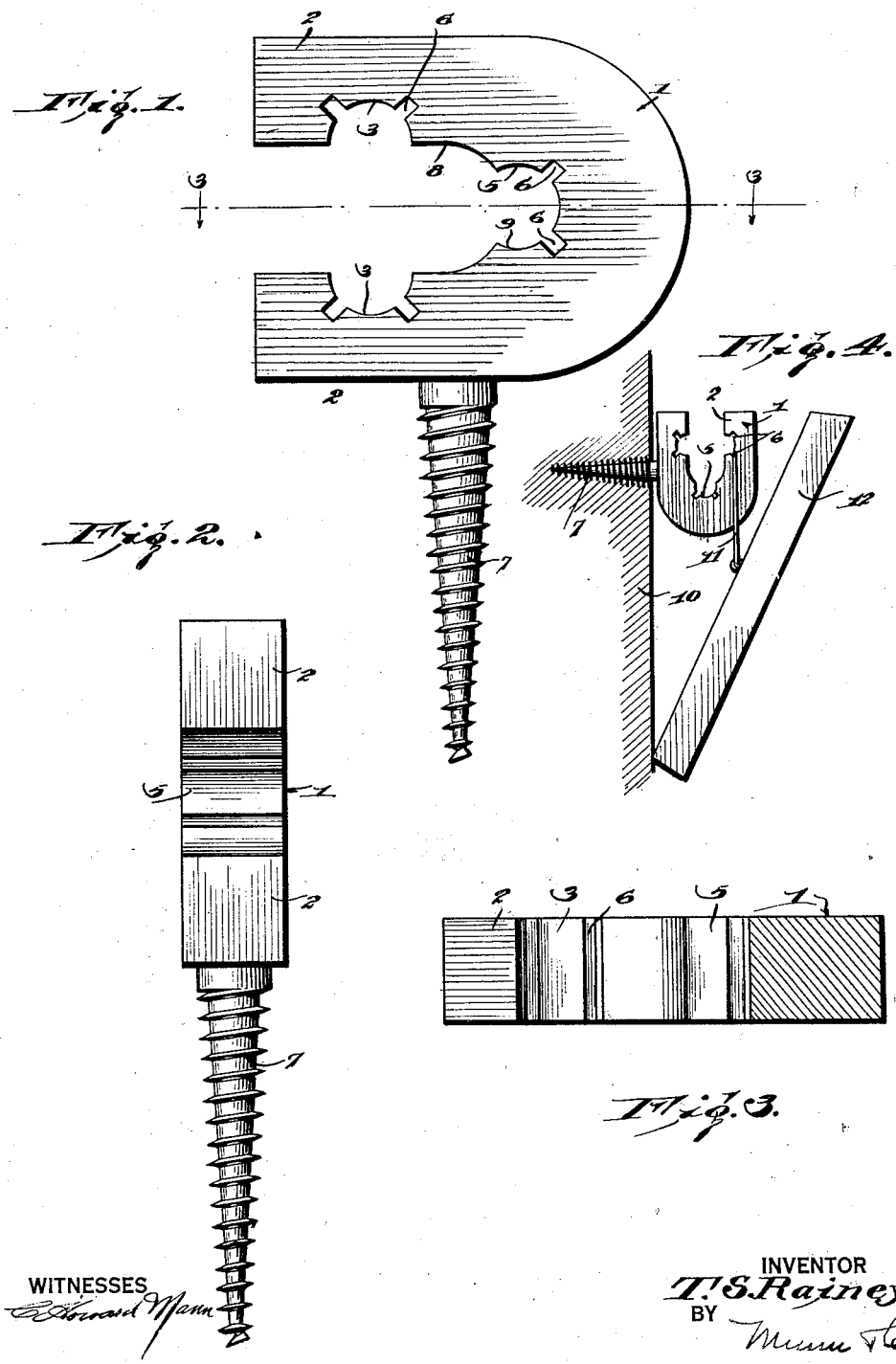
INVENTOR
T. S. Rainey,
BY
ATTORNEY
WITNESSES Patented May 6, 1930

1,757,875

UNITED STATES PATENT OFFICE

THOMAS S. RAINEY, OF NEW ORLEANS, LOUISIANA

SUSPENSION HOOK

Application filed June 1, 1929. Serial No. 367,744.

My invention relates to suspension hooks and it consists in the construction, arrangement and combination of parts herein described and claimed.

It is an object of my invention to provide a suspension hook which will readily support a picture frame or the like, at various angles, without liability of slipping, or disengagement of the suspension cord.

A further object of the invention is to provide a suspension hook which may be employed for the suspension of curtain poles or the like.

A still further object of the invention is to provide a suspension hook which may be readily formed from a single piece of material, and which will be strong and durable.

Additional objects, advantages and features of invention will be apparent from the following description and accompanying drawings wherein, Figure 1 is a side elevation of my suspension hook, Figure 2 is a top plan view thereof, Figure 3 is a cross section on the line 3—3 of Fig. 1, Figure 4 is a view illustrating my device in use as a support for a picture frame.

In carrying out my invention I provide a body 1 of heavy formation and substantially U-shaped in plan, thus providing leg portions 2.

Each of the legs 2 has a circular recess 3 formed in its inner edge and the bight portion 4 is similarly formed with a recess 5. The recesses 3 and 5 have radially extending notches 6 respectively.

Integrally formed with the body 1 and extending at right angles thereto, I provide a screw-threaded member 7 which affords a means for attaching the hook upon a wall or other support.

The hook 1 may be secured to a wall or support so as to extend at right angles thereto, or it may be secured at a more acute angle to the supporting surface, and in either of such positions, certain of the notches will be so disposed as to readily accommodate a suspension cord of an article to be suspended.

It should be noted that the legs 2 are spaced a substantial distance apart and have a recess 8. Communicating with the recess 8 there is a restricted recess 9. These recesses permit the insertion of supporting rods or strands of relatively large and small members, such as curtain rods. In the use as a support for curtain rods, a hook 1 is positioned at opposite sides of a window, and the curtain rod is disposed so as to rest in one of these recesses 8 or 9, as the case may be.

Reference is now made to Figure 4 of the drawing, wherein one application of my invention is illustrated for supporting a picture frame. In this instance the hook 1 is supported in a wall 10 and extends at right angles thereto, with a suspension cord 11 of the picture frame 12 engaged in one of the notches 6 of the outer leg members 2. It will be noted that the cord 11 may be engaged within other of the notches 6, especially those directed downwardly or rearwardly from the leg portions 2, but such disposition of the cord will cause a different tilt or different height to which the frame 12 is suspended.

From the foregoing it will be apparent that I have provided a hook which will be found readily adapted for the suspension of various articles such as picture frames, hanging porch baskets, curtain rods and the like articles.

I claim:—

1. A suspension hook comprising a body having parallel leg members, recesses formed upon the inner surfaces of said leg members, divergent slots extending from said recesses, and support means for said body.

2. A suspension hook comprising a U-shaped body having a bight portion and parallel leg members, circular recesses formed in said bight portion and inner surfaces of said leg members, slots communicating with each of said recesses, and a screw threaded support mounting said U-shaped body.

3. A suspension hook comprising a body member substantially U-shaped in plan, and a support therefor, said body member having a plurality of recesses to accommodate supporting structures of varying diameters.

4. A suspension hook comprising a body member substantially U-shaped in plan, a recess in the bight portion thereof, and a second larger recess in superposed relation thereto and in communication with said first named recess whereby strands of varying diameters may be accommodated.

5. A suspension hook, comprising a substantially U-shaped body, laterally extending means on said body for supporting said member, said body having a plurality of recesses formed thereon, and a plurality of angularly disposed slots communicating with each of said recesses respectively.

THOMAS S. RAINEY.